US012780364B2

(12) United States Patent
Johansen

(10) Patent No.: US 12,780,364 B2
(45) Date of Patent: Nov. 3, 2026

(54) METHOD FOR CONTROLLING TRANSFER OF A SUSPENDED LOAD BETWEEN AN OFFSHORE WIND TURBINE AND A FLOATING VESSEL

(71) Applicant: Vestas Wind Systems A/S, Aarhus N (DK)

(72) Inventor: Rasmus Sanderhoff Johansen, Hørning (DK)

(73) Assignee: Vestas Wind System A/S, Aarhus N. (DK)

( * ) Notice: Subject to any disclaimer, the term of this patent is extended or adjusted under 35 U.S.C. 154(b) by 0 days.

(21) Appl. No.: 18/874,864

(22) PCT Filed: Jun. 13, 2023

(86) PCT No.: PCT/DK2023/050145
§ 371 (c)(1),
(2) Date: Dec. 13, 2024

(87) PCT Pub. No.: WO2023/246993
PCT Pub. Date: Dec. 28, 2023

(65) Prior Publication Data
US 2025/0360989 A1 Nov. 27, 2025

(30) Foreign Application Priority Data
Jun. 22, 2022 (DK) .................................. 202270333

(51) Int. Cl.
*B63B 27/32* (2006.01)
*B63B 79/30* (2020.01)
(Continued)

(52) U.S. Cl.
CPC .............. *B63B 27/32* (2013.01); *B63B 79/30* (2020.01); *B66C 23/207* (2013.01); *B66C 23/53* (2013.01);
(Continued)

(58) Field of Classification Search
CPC . B63B 2017/0072; B63B 27/30; B63B 27/16; B63B 27/32; B63B 79/30;
(Continued)

(56) References Cited

U.S. PATENT DOCUMENTS 3,624,783 A * 11/1971 Chang ..................... B66C 13/02
318/6
3,753,552 A * 8/1973 Barron ..................... B66D 1/52
414/142.8
(Continued)

FOREIGN PATENT DOCUMENTS

DE 102014000040 A1 * 7/2015 ............. F03D 13/10
DK 201800520 A1 8/2019
(Continued)

OTHER PUBLICATIONS

International Searching Authority, International Search Report and Written Opinion issued in corresponding PCT Application No. PCT/DK2023/050145, dated Deptember 18, 2023.
(Continued)

*Primary Examiner* — Gregory W Adams
(74) *Attorney, Agent, or Firm* — Wood, Herron & Evans LLP

(57) ABSTRACT

A method and a system (1) for controlling transfer of a suspended load (2) between an offshore wind turbine (3) and a floating vessel (4) are disclosed. Movements, relative to the floating vessel (4), of a load (2) suspended in a hoisting mechanism (6, 15) and/or of a hooking part (9) of the hoisting mechanism (6, 15), are detected. A position and/or inclination of a landing platform (8) arranged on the floating vessel (4) is adjusted, based on the detected movements, in order to compensate for relative movements between the floating vessel (4) and the suspended load (2) and/or the hooking part (9), thereby synchronizing movements of the landing platform (4) to movements of the suspended load (2)
(Continued)

and/or the hooking part (9), while moving the suspended load (2) and/or the hooking part (9) towards the adjustable landing platform (8).

15 Claims, 5 Drawing Sheets

(51) Int. Cl.

| | |
|---|---|
| ***B66C 23/20*** | (2006.01) |
| ***B66C 23/53*** | (2006.01) |
| ***F03D 13/10*** | (2016.01) |
| ***F03D 13/25*** | (2016.01) |
| *B63B 35/44* | (2006.01) |
| *F03D 80/50* | (2016.01) |

(52) U.S. Cl.
CPC ......... *F03D 13/126* (2023.08); *F03D 13/256* (2023.08); *B63B 2035/446* (2013.01); *F03D 80/50* (2016.05); *F05B 2230/6102* (2013.01)

(58) Field of Classification Search
CPC . B63B 2035/446; B66C 23/52; B66C 23/207; B66C 23/53; F03D 13/126; F03D 13/256; F03D 80/50; F05B 2230/6102

See application file for complete search history.

(56) References Cited

U.S. PATENT DOCUMENTS

| | | | | | |
|---|---|---|---|---|---|
| 4,180,362 | A * | 12/1979 | Stair | B66D 1/52 414/803 |
| 4,215,851 | A * | 8/1980 | Holmen | B66C 13/02 414/139.7 |
| 4,854,800 | A * | 8/1989 | Frick | B66C 13/02 414/803 |
| 4,932,541 | A * | 6/1990 | Belsterling | B66C 13/02 414/139.7 |
| 7,367,464 | B1 * | 5/2008 | Agostini | B66C 13/063 212/308 |
| 9,487,277 | B2 * | 11/2016 | van der Tempel | B63B 17/00 |
| 9,849,944 | B2 * | 12/2017 | Foo | B66C 13/46 |
| 9,902,596 | B2 * | 2/2018 | Morrow | B66C 13/46 |
| 10,308,327 | B1 * | 6/2019 | Van Loon | F03D 13/10 |
| 11,021,348 | B2 * | 6/2021 | Zimmer | B66C 13/02 |
| 2020/0141388 | A1 | 5/2020 | Moeller | |
| 2020/0158086 | A1 | 5/2020 | Van Der Tempel | |

FOREIGN PATENT DOCUMENTS

| | | | | |
|---|---|---|---|---|
| EP | 2520792 A1 | | 11/2012 | |
| EP | 2572976 A1 | | 3/2013 | |
| GB | 2487230 A | * | 7/2012 | B66C 23/207 |
| NL | 2015891 B1 | * | 6/2017 | B63B 27/14 |

OTHER PUBLICATIONS

Danish Patent and Trademark Office, technical examination issued in corresponding DK Application No. PA 2022 70333, dated Jan. 5, 2023.

* cited by examiner

METHOD FOR CONTROLLING TRANSFER OF A SUSPENDED LOAD BETWEEN AN OFFSHORE WIND TURBINE AND A FLOATING VESSEL

FIELD OF THE INVENTION

The present invention relates to a method for controlling transfer of a suspended load from an offshore wind turbine to a floating vessel, such as a barge, or from a floating vessel to an offshore wind turbine. The method according to the invention allows the suspended load to be transferred between the offshore wind turbine and the floating vessel in a manner which reduces the risk of damage to the suspended load, the offshore wind turbine and/or the floating vessel.

BACKGROUND OF THE INVENTION

In offshore wind turbines it is sometimes necessary to install or remove parts or components of the wind turbines. Such components could, e.g., be wind turbine blades, gearbox, hub, main shaft, generator, various bearing, etc. Such parts or components are often transported to or from the site of the offshore wind turbine by means of a floating vessel, such as a barge. The floating vessel is typically positioned, e.g. moored, next to the offshore wind turbine while the relevant component is transferred from the offshore wind turbine to the floating vessel or from the floating vessel to the offshore wind turbine, depending on whether the component is being removed from or installed in the offshore wind turbine. The component may then be transferred to or from the floating vessel by means of a hoisting mechanism, and the component may be suspended from the hoisting mechanism during the transfer, the component thereby forming a suspended load.

One challenge when transferred a suspended load between an offshore wind turbine and a floating vessel, as described above, is that a relative movement is introduced between the offshore wind turbine and the floating vessel, inter alia due to waves. This introduces a risk of collisions between the suspended load and the floating vessel during the part of the transfer process where the suspended load is lifted from or positioned on the floating vessel. This, in turn, may lead to damage on the suspended load and/or the floating vessel.

DESCRIPTION OF THE INVENTION

It is an object of embodiments of the invention to provide a method for controlling transfer of a suspended load between an offshore wind turbine and a floating vessel, in which the risk of damaging the suspended load and/or the floating vessel is reduced as compared to prior art methods.

According to a first aspect the invention provides a method for controlling transfer of a suspended load between an offshore wind turbine and a floating vessel, where a hoisting mechanism is connected to the offshore wind turbine, and the floating vessel comprises an adjustable landing platform, the method comprising the steps of:

- detecting movements, relative to the floating vessel, of a load suspended in the hoisting mechanism and/or of a hooking part of the hoisting mechanism, the hooking part being adapted for connecting a load to the hoisting mechanism,
- adjusting a position and/or inclination of the landing platform, based on the detected movements, in order to compensate for relative movements between the floating vessel and the suspended load and/or the hooking part, thereby synchronizing movements of the landing platform to movements of the suspended load and/or the hooking part, and
- moving the suspended load and/or the hooking part towards the adjustable landing platform.

Thus, the method according to the first aspect of the invention is a method for transferring a suspended load between an offshore wind turbine and a floating vessel. The suspended load may be transferred from the offshore wind turbine to the floating vessel, or from the floating vessel to the offshore wind turbine.

In the present context the term 'offshore wind turbine' should be interpreted to mean a wind turbine which is positioned offshore, e.g. at sea or on a lake.

In the present context the term 'floating vessel' should be interpreted to mean a vessel which is able to float on water, e.g. a seagoing vessel, such as a barge, a ship, etc.

The suspended load may, e.g., be a part or a component of a wind turbine which needs to be installed in or removed from the offshore wind turbine, e.g. due to replacement, maintenance or repair of the offshore wind turbine, or as part of erection or decommission of the offshore wind turbine.

A hoisting mechanism is connected to the offshore wind turbine. The hoisting mechanism is used of moving the suspended load to or from the floating vessel in a manner which will be described in further detail below. In the present context the term 'connected to the offshore wind turbine' should be interpreted to mean that at least one connection point or attachment point exists between the hoisting mechanism and the offshore wind turbine. Thus, the hoisting mechanism may form part of or be mounted directly on the offshore wind turbine. As an alternative, the hoisting mechanism may be connected to the offshore wind turbine via one or more guides, wires, pulleys, wheels and/or other suitable mechanisms. In any event, at least a part of the hoisting mechanism is stationary with respect to the offshore wind turbine.

The floating vessel comprises an adjustable landing platform. In the present context the term 'landing platform' should be interpreted to mean a platform which is adapted to receive a load being transferred from the offshore wind turbine to the floating vessel, or to have a load which is to be transferred from the floating vessel to the offshore wind turbine positioned thereon. Accordingly, the landing platform forms the part of the floating vessel which receives or delivers the load being transferred.

The landing platform is adjustable. This should be interpreted to mean that the platform is able to move relative to the floating vessel. This will be described in further detail below.

In the method according to the first aspect of the invention, movements of a load suspended in the hoisting mechanism and/or of a hooking part of the hosting mechanism, relative to the floating vessel, are initially detected. The hooking part is a part of the hoisting mechanism which is adapted for connecting a load to the hoisting mechanism. The hooking part may, e.g., be a hook or any other suitable kind of mechanism which can connect or attach the load to the hoisting mechanism in order to enable the hoisting mechanism to move the suspended load.

In the case that the suspended load is transferred from the offshore wind turbine to the floating vessel, the load will be attached to the hoisting mechanism via the hooking part, as it approaches the floating vessel. In this case the hooking part and the suspended load move in unison, and therefore the movements of the suspended load, movements of the hooking part or both may suitably be detected.

In the case that the suspended load is transferred from the floating vessel to the offshore wind turbine, the load will be positioned on the adjustable landing platform, while the hooking part is moved towards the adjustable landing platform and the load. In this case the movement of the hooking part may suitably be detected.

Thus, the relative movements between the load being transferred and the floating vessel receiving the load, or between the load being transferred and a hooking part which is to be connected to the load, are detected. Accordingly, relative movements between two parts which need to meet, i.e. the load suspended in the hoisting mechanism and the floating vessel, or the load positioned on the floating vessel and the hooking part of the hoisting mechanism, are detected.

Next, a position and/or inclination of the landing platform is adjusted. This is performed based on the detected movements, and in order to compensate for relative movements between the floating vessel and the suspended load and/or the hooking part. Thus, the landing platform is adjusted or moved in such a manner that it is synchronized with the movements of the suspended load and/or the hooking part. Thus, even though the floating vessel moves relative to the offshore wind turbine and relative to the suspended load and/or hooking part, due to impact from waves, wind, etc., the movements of the landing platform compensate for this. Thereby, when the load and/or the hooking part approaches the landing platform, their relative movements are minimised. This considerably reduces the risk of collisions between the suspended load and the landing platform, or between the hooking part and the load. Thereby the risk of damaging the load, the floating vessel and/or the hooking part is also considerably reduced.

Finally, the suspended load and/or the hooking part is moved towards the adjustable landing platform, in order to position the load on the landing platform or pick up the load from the landing platform, in a controlled manner.

The load may be suspended in the hoisting mechanism, via the hooking part, and the method may further comprise the steps of:

- moving the suspended load towards the adjustable landing platform,
- positioning the suspended load on the adjustable landing platform, and
- releasing the load from the hooking part.

According to this embodiment, the load is being transferred from the offshore wind turbine to the floating vessel. Accordingly, the load is suspended in the hoisting mechanism, via the hooking part, while it is moved from the offshore wind turbine towards the adjustable landing platform on the floating vessel.

When the load has been moved into contact with the adjustable landing platform, it is positioned thereon. Once the load is firmly supported by the adjustable landing platform, it is released from the hooking part, and the hooking part may then be moved away from the load and the landing platform.

Once the load has been positioned on the landing platform and released from the hooking part, and the hooking part is clear of the load and the landing platform, the process of detecting relative movements and adjusting the landing platform based thereon may be discontinued, since then it is no longer a problem that there are relative movements between the hooking part and the load positioned on the landing platform.

The method may further comprise the steps of attaching the load to the hooking part, at an uptower position of the offshore wind turbine, and moving the load towards the adjustable landing platform by means of the hoisting mechanism.

In the present context the term 'uptower position' should be interpreted to mean a part of the offshore wind turbine which is arranged at or near an upper part of the tower, including inside or outside a nacelle mounted on top of the tower or inside or outside an upper part of the tower. Components of the offshore wind turbine which might need to be installed, removed or replaced are often positioned or mounted in an uptower position, such as in the nacelle.

Thus, according to this embodiment, when such a component has been detached from the wind turbine, it is attached to the hooking part of the hoisting mechanism, at the uptower position, and therefore near the position where it was mounted on the offshore wind turbine. Then it is moved from the uptower position towards the adjustable landing platform by means of the hoisting mechanism.

As an alternative, the load may be positioned on the adjustable landing platform, and the method may further comprise the steps of:

- moving the hooking part towards the load positioned on the adjustable landing platform,
- attaching the load to the hooking part, and
- hoisting the load away from the adjustable landing platform towards an uptower position of the offshore wind turbine by means of the hoisting mechanism.

According to this embodiment, the load is transferred from the floating vessel to the offshore wind turbine. Accordingly, the load is initially positioned on the landing platform, and the hooking part is moved towards the landing platform, and thereby towards the load. Once the hooking part has been moved sufficiently close to the load, the load is attached to the hooking part. Subsequently, the load is hoisted away from the landing platform and towards the uptower position of the offshore wind turbine by means of the hoisting mechanism.

Once the load is clear of the landing platform, the process of detecting relative movements and adjusting the landing platform based thereon may be discontinued, since then it is no longer a problem that there are relative movements between the suspended load and the landing platform.

The method may further comprise the step of releasing the load from the hooking part at the uptower position of the offshore wind turbine.

According to this embodiment, once the load has been moved to the uptower position of the offshore wind turbine, it is released from the hooking part and positioned at the uptower position of the offshore wind turbine. Subsequently, the load, e.g. in the form of a component of the offshore wind turbine, may be installed appropriately in the offshore wind turbine.

The method may further comprise the step of guiding the suspended load and/or the hooking part by means of one or more taglines.

In the present context the term 'tagline' should be interpreted to mean a line or a wire which is used for guiding a suspended item or load during handling. One end of the tagline is typically attached to the item or load, while an opposite end of the tagline is connected to a mechanism which can keep the tagline tight, and thereby assist in stabilising or guiding the suspended item or load. The mechanism may include a winch which winds and unwinds the tagline in accordance with the movements of the suspended item or load.

Thus, according to this embodiment, the suspended load and/or the hooking part is stabilised and guided during the movement towards the landing platform. This even further reduces the risk of collisions between the load and the landing platform or between the hooking part and the load. It is an advantage to a apply one or more taglines in combination with the landing platform being adjustable in the manner described above, because thereby at least most of the movements of the floating vessel caused by waves are compensated by the adjustments of the landing platform, and the winch of the tagline mechanism only needs to perform minor adjustments in order to keep the tagline tight.

The step of detecting movements of a load suspended in the hoisting mechanism and/or of a hooking part of the hoisting mechanism may comprise detecting the movements by means of one or more sensors arranged on the suspended load and/or the hooking part, and the method may further comprise the step of communicating sensor readings from the one or more sensors to a control unit for controlling the adjustable landing platform.

According to this embodiment, one or more sensors are arranged on the suspended load and/or on the hooking part. Thereby the movements of the suspended load and/or the hooking part are measured directly. The sensors may, e.g., include accelerometers, gyroscopes, compasses, and/or any other suitable kind of sensor being able to detect movement, position, orientation, inclination, etc. of the suspended load and/or the hooking part.

The measurements performed by the one or more sensors, i.e. the readings from the sensors, are then communicated to a control unit which handles the control of the adjustable landing platform. Accordingly, the control unit receives the sensor readings and applies these as input for calculating how to move the adjustable landing platform in order to compensate for the relative movements and synchronize the movements of the landing platform to the movements of the suspended load and/or the hooking part.

The sensor readings may, e.g., be communicated wirelessly to the control unit. They may be communication continuously or in batches.

The control unit may be arranged on the floating vessel, e.g. adjacent to or forming part of the adjustable landing platform.

As an alternative, one or more sensors may be arranged to detect the movements of the suspended load and/or the hooking part remotely. For instance, an optical sensor may be arranged on the floating vessel for detecting movements of specific parts of the suspended load and/or the hooking part. The suspended load and/or the hooking part may, e.g., be provided with suitable markers for the purpose.

The offshore wind turbine may be mounted on a floating foundation. A floating foundation is typically moored to one or more anchor points on the seabed, and the offshore wind turbine is allowed to perform limited movements which are restricted by the mooring lines. Furthermore, the floating foundation, and thereby the offshore wind turbine, moves up and down along with the waves. Thus, according to this embodiment, the relative movements between the floating vessel and the wind turbine, and thereby also between the floating vessel and the suspended load and/or the hooking part, may be expected to be relatively large. Therefore, the method according to the invention is particularly relevant in this case.

As an alternative, the offshore wind turbine may be mounted on a foundation which is fixed relative to the seabed, such as a monopile.

The method may further comprise the step of transferring the suspended load from the hoisting mechanism to a floating hoisting mechanism arranged on the floating vessel and/or from the floating hoisting mechanism to the hoisting mechanism.

According to this embodiment, an additional hoisting mechanism, in the form of the floating hoisting mechanism, is arranged on the floating vessel. The floating hoisting mechanism handles the movement of the suspended load in the region near the landing platform. Therefore, in order to enable movement of the suspended load from the landing platform to, e.g., an uptower part of the offshore wind turbine, or vice versa, the suspended load needs to be transferred between the hoisting mechanism and the floating hoisting mechanism at some point.

In the case that the suspended load is being moved from the offshore wind turbine to the landing platform, the suspended load must be transferred from the hoisting mechanism to the floating hoisting mechanism, and the floating hoisting mechanism subsequently positions the suspended load on the landing platform. Similarly, in the case that the suspended load is being moved from the landing platform to the offshore wind turbine, the floating hoisting mechanism picks up the load from the landing platform, and the suspended load is subsequently transferred from the floating hoisting mechanism to the hoisting mechanism.

In order to ensure a smooth transfer between the hoisting mechanism and the floating hoisting mechanism, compensation and synchronisation between the hoisting mechanisms may be required in a manner similar to the method according to the invention.

The floating hoisting mechanism may be arranged on the adjustable landing platform. Thereby the floating hoisting mechanism follows the movements of the adjustable landing platform, and it can thereby be synchronised with movements of the suspended load and/or the hooking part.

According to a second aspect the invention provides a system for transferring a suspended load, the system comprising:

- an offshore wind turbine,
- a hoisting mechanism being connected to the offshore wind turbine, the hoisting mechanism comprising a hooking part being adapted for connecting a load to the hoisting mechanism,
- a floating vessel comprising an adjustable landing platform,
- means for detecting movements, relative to the floating vessel, of a load suspended in the hoisting mechanism and/or of the hooking part of the hoisting mechanism,
- means for adjusting a position and/or inclination of the landing platform, based on the detected movements in order to compensate for relative movements between the floating vessel and the suspended load and/or the hooking part.

The system according to the second aspect of the invention may be used for performing the method according to the first aspect of the invention. A person skilled in the art would therefore readily recognise that any feature described in combination with the first aspect of the invention could also be combined with the second aspect of the invention, and vice versa. Accordingly, the remarks set forth above are equally applicable here.

The hoisting mechanism may form part of the offshore wind turbine. For instance, the hoisting mechanism may be or comprise a crane mounted on or forming part of the offshore wind turbine, e.g. in or on the nacelle.

As an alternative, the hoisting mechanism may merely be connected to the offshore wind turbine, e.g. via one or more wires. This has already been described above.

The system may further comprise one or more taglines for guiding the suspended load. This has already been described above.

The offshore wind turbine may be mounted on a floating foundation. This has already been described above.

The system may further comprise a floating hoisting mechanism arranged on the floating vessel. This has already been described above.

BRIEF DESCRIPTION OF THE DRAWINGS

The invention will now be described in further detail with reference to the accompanying drawings in which.

DETAILED DESCRIPTION OF THE DRAWINGS

Figure 1:
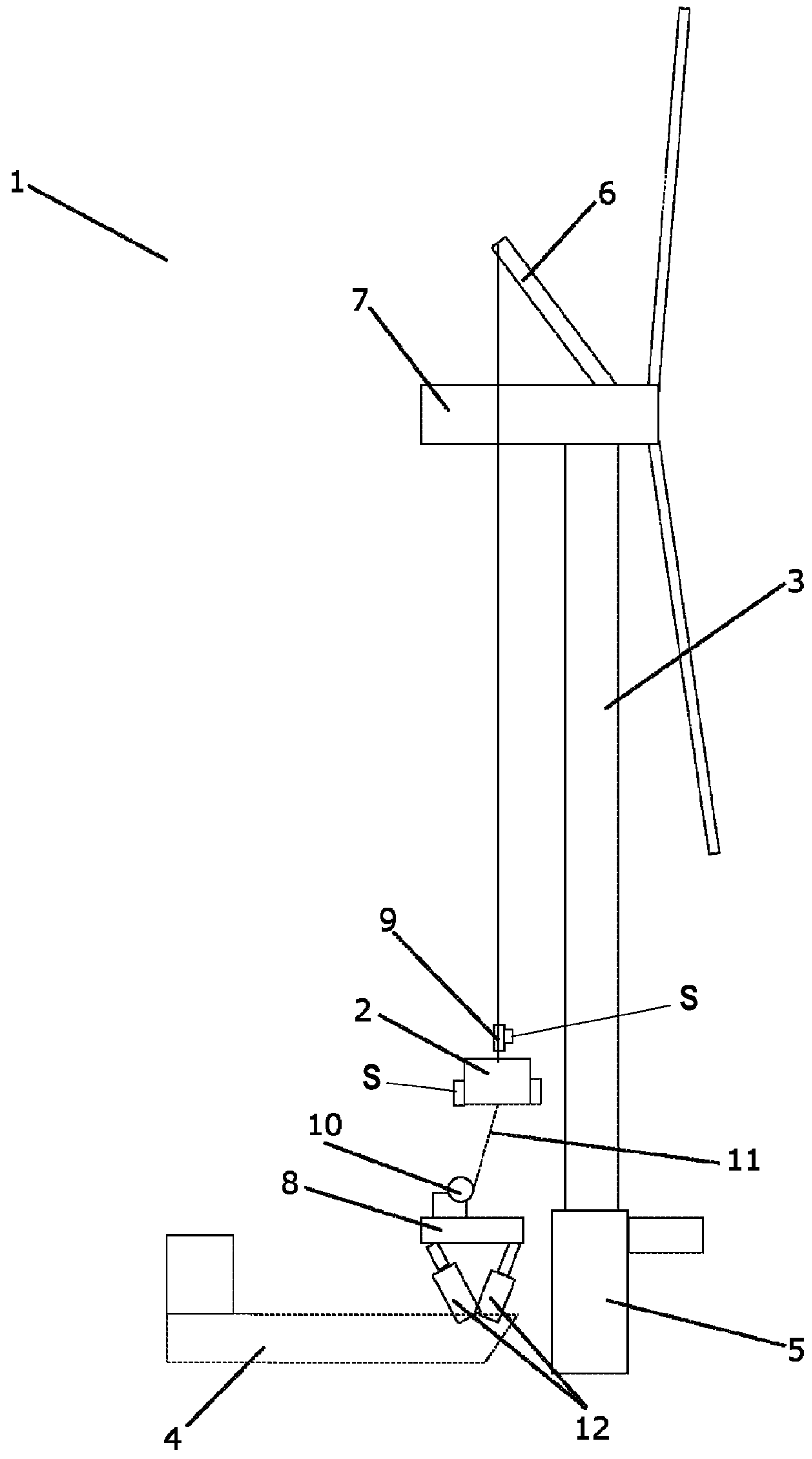
FIGS. 1-5 illustrate systems for transferring a suspended load according to five different embodiments of the invention.

FIG. 1 is a schematic view of a system 1 for transferring a suspended load 2 according to a first embodiment of the invention. The system 1 comprises an offshore wind turbine 3 and a floating vessel 4 positioned adjacent to the offshore wind turbine 3. The offshore wind turbine 3 is mounted on a monopile 5, i.e. it is fixed to the seabed. The load 2 may, e.g., be a component for the offshore wind turbine 3, such as a gearbox, a shaft, a bearing, a generator, etc., which is to be installed in the offshore wind turbine 3 or removed therefrom. A hoisting mechanism 6, in the form of a crane, is mounted on a nacelle 7 of the offshore wind turbine 3. An adjustable landing platform 8 is arranged on the floating vessel 4.

The load 2 is attached to the hoisting mechanism 6 via a hooking part 9, and it is in the process of being hoisted from the landing platform 8 towards the nacelle 7 of the offshore wind turbine 3, or being lowered from the nacelle 7 of the offshore wind turbine 3 towards the landing platform 8. The load 2 is further connected to a winch 10 arranged on the landing platform 8, via a tagline 11.

The system 1 of FIG. 1 may be operated in the following manner. In the case that the load 2 is being removed from the offshore wind turbine 3, it is initially detached from the position where it was installed and attached to the hooking part 9 of the hoisting mechanism 6 at or near the nacelle 7. Furthermore, the tagline 11 is connected to the load 2.

The load 2 is then lowered towards the landing platform 8 by means of the hoisting mechanism 6. During this, the winch 10 ensures that the tagline 11 is kept tight in order to guide the load 2.

During the entire movement of the load 2 towards the landing platform 8, or at least when the load 2 approaches the landing platform 8, movements of the suspended load 2 and/or the hooking part 9, relative to the floating vessel 4, are detected. This could be performed by means of suitable sensors S mounted directly on the load 2 and/or the hooking part 9, such as accelerometer, gyroscopes, compasses, and/or any other suitable kind of sensor being able to detect movement, position, orientation, inclination, etc. of the suspended load 2 and/or the hooking part 9. Alternatively, remote monitoring, e.g. optical monitoring, of specific parts and/or markers on the suspended load 2 and/or the hooking part 9 may be applied.

Based on the measured relative movements, a position and/or inclination of the landing platform 8 is/are adjusted. This is done by appropriately adjusting pistons 12 which interconnect the landing platform 8 and the floating vessel 4.

Accordingly, the landing platform 8 is moved in such a manner that it compensates for the relative movements between the suspended load 2 and the floating vessel 4. Thereby the movements of the landing platform 8 are synchronized to the movements of the suspended load 2, which is approaching the landing platform 8. This allows the suspended load 2 to be moved the last part of the way to the landing platform 8 and positioned thereon with no, or only very small, relative movements between the suspended load 2 and the landing platform 8. Thereby the risk of collisions between the load 2 and the landing platform 8 during this part of the process is significantly reduced.

Once the load 2 has been safely positioned on the landing platform 8, it may be released from the hooking part 9, and the hooking part 9 may be hoisted away from the landing platform 8 by means of the hoisting mechanism 6.

In the case that the load 2 is being installed in the offshore wind turbine 3, the load 2 is initially positioned on the landing platform 8. The hooking part 9 of the hoisting mechanism 6 is lowered towards the landing platform 8 and the load 2 positioned thereon.

During this, the movements of the hooking part 9, relative to the floating vessel 4 are detected, and the position and/or inclination of the landing platform 8 is/are adjusted based thereon, and in the manner described above. Thereby the hooking part 9 can be moved close to the load 2 without risking collisions between the hooking part 9 and the load 2.

When the hooking part 9 has been moved sufficiently close to the load 2, the load 2 is attached to the hooking part 9 and to the tagline 11. The load 2 is then hoisted from the landing platform 8 towards the nacelle 7 of the offshore wind turbine 3, by means of the hoisting mechanism 6 and while guiding the load 2 by means of the tagline 11.

When the load 2 has reached the nacelle 7, it is disconnected from the hooking part 9 and installed in an appropriate position at the offshore wind turbine 3.

Figure 2:
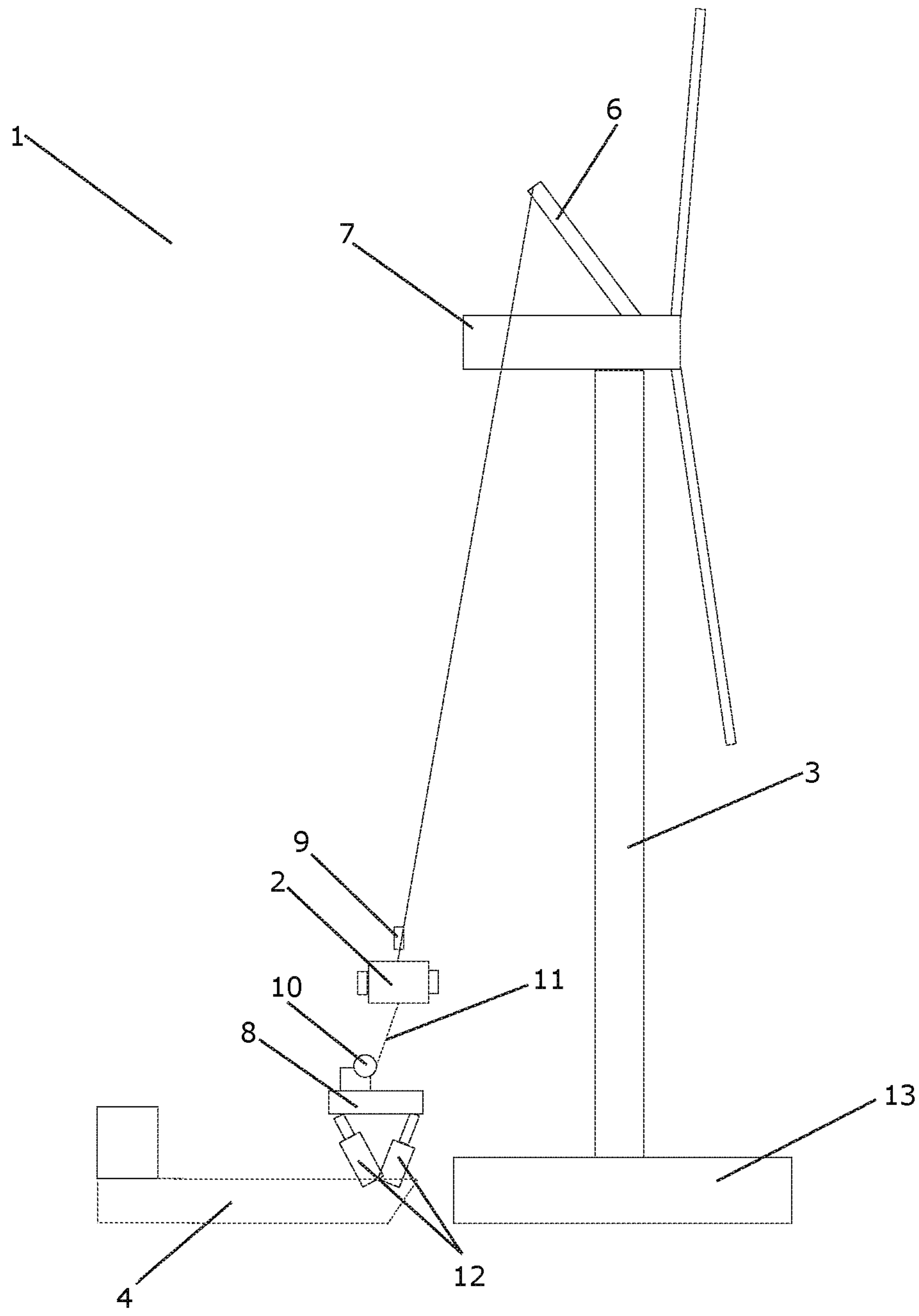

FIG. 2 is a schematic view of a system 1 for transferring a suspended load 2 according to a second embodiment of the invention. The system 1 of FIG. 2 is very similar to the system 1 of FIG. 1, and it will therefore not be described in detail here.

In the system 1 of FIG. 2, the offshore wind turbine 3 is mounted on a floating foundation 13. Thereby the offshore wind turbine 3 also follows movements of the waves, similar to the floating vessel 4. This is likely to cause larger relative movements between the offshore wind turbine 3 and the floating vessel 4, and thereby also between the load 2 suspended from the hoisting mechanism 6 on the offshore wind turbine 3 and the floating vessel 4. Therefore, the method according to the invention described above with reference to FIG. 1 is particularly suitable in the system 1 of FIG. 2.

Figure 3:
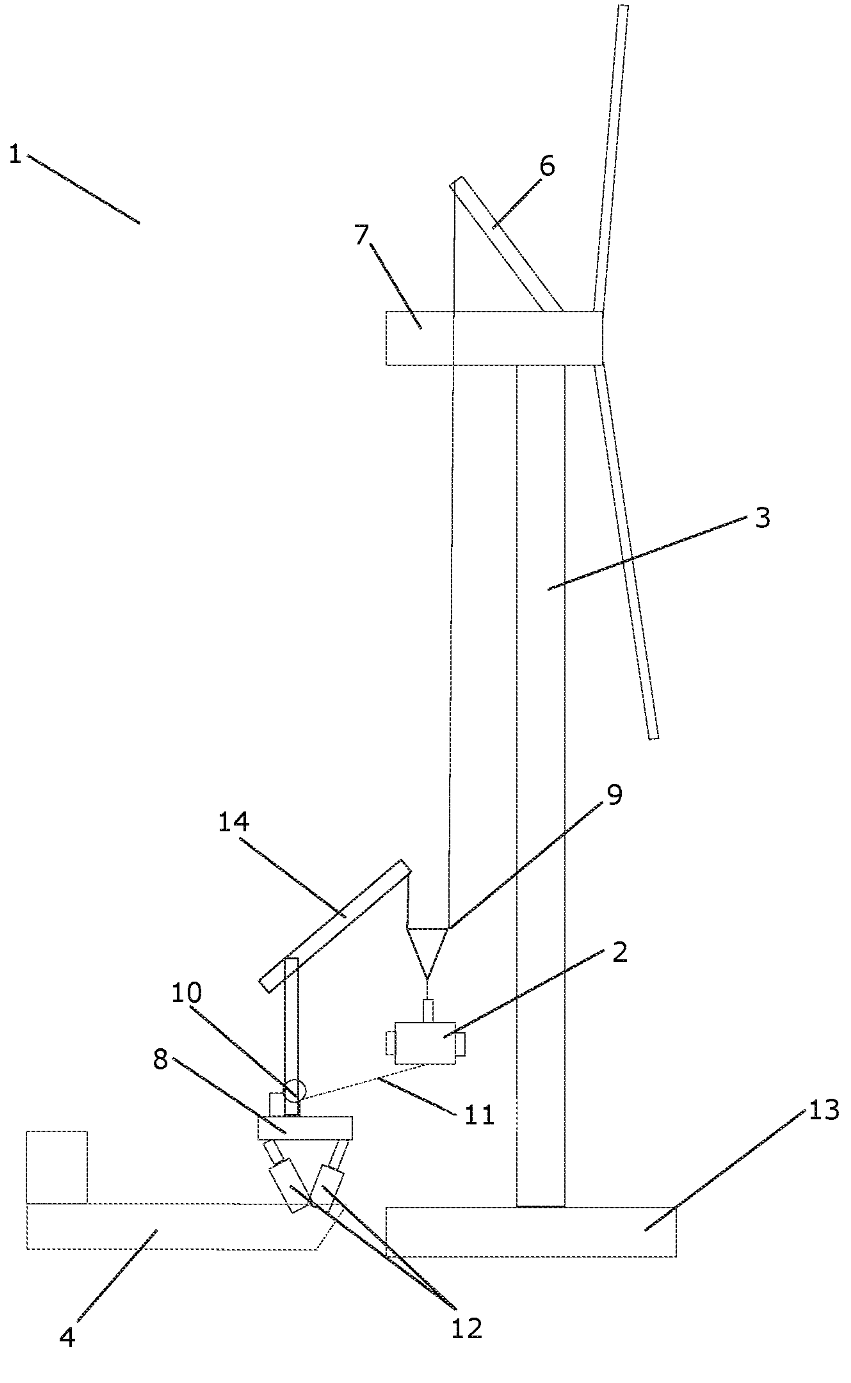

FIG. 3 is a schematic view of a system 1 for transferring a suspended load 2 according to a third embodiment of the invention. The system 1 of FIG. 3 is very similar to the system 1 of FIG. 2, and it will therefore not be described in detail here.

The system 1 of FIG. 3 further comprises a floating hoisting mechanism 14 arranged on the landing platform 8. The floating hoisting mechanism 14 handles the movements of the load 2 during the part of the transfer process where the load 2 is closest to the landing platform 8.

In the case that the load 2 is being transferred from the nacelle 7 of the offshore wind turbine 3 to the landing platform 8, the load 2 is initially transferred by means of the hoisting mechanism 6, essentially in the manner described above with reference to FIG. 1. At some point, the load 2 is transferred from the hoisting mechanism 6 to the floating hoisting mechanism 14. In order to ensure a smooth transfer, relative movements between the load 2 and the floating hoisting mechanism 14 must be minimised. This is done by detecting movements of the suspended load 2 and/or the hooking part 9, relative to the floating vessel 4, and adjusting the position and/or inclination of the landing platform 8 based thereon, essentially as described above with reference to FIG. 1.

Once the load 2 has been transferred to the floating hoisting mechanism 14, the load 2 is lowered further and positioned on the landing platform 8 by means of the floating hoisting mechanism 14.

In the case that the load 2 is being transferred from the landing platform 8 to the nacelle 7 of the offshore wind turbine 3, the load 2 is initially connected to the floating hoisting mechanism 14, and the load 2 is hoisted away from the landing platform 8 by means of the floating hoisting mechanism 14. At some point the load 2 is transferred from the floating hoisting mechanism 14 to the hoisting mechanism 6, while the relative movements between the load 2, connected to the floating hoisting mechanism 14, and the hooking part 9 of the hoisting mechanism 6 are minimised by appropriately adjusting the position and/or inclination of the landing platform 8, essentially as described above.

Once the load 2 has been transferred to the hoisting mechanism 6, the load 2 is hoisted to the nacelle 7 by means of the hoisting mechanism 6.

Figure 4:
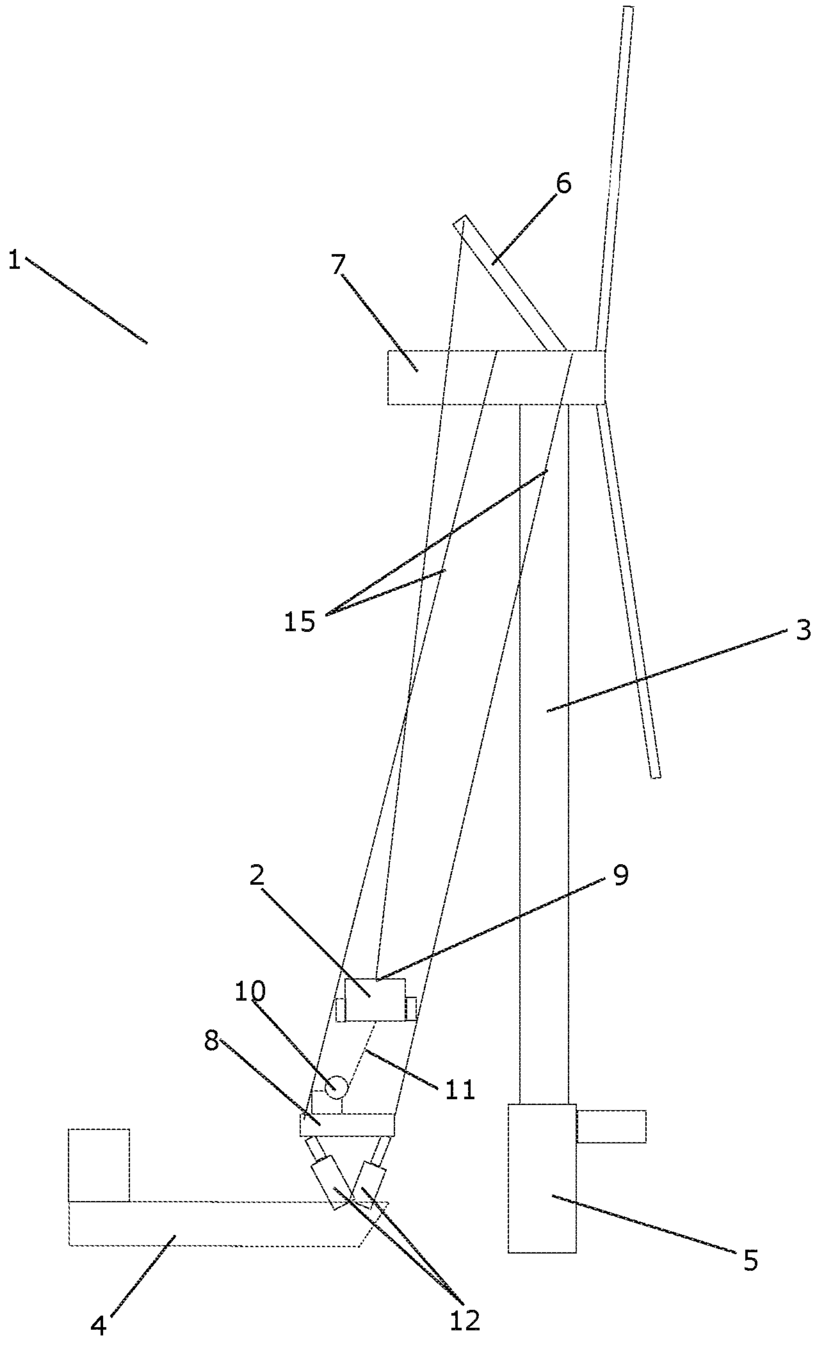

FIG. 4 is a schematic view of a system 1 for transferring a suspended load 2 according to a fourth embodiment of the invention. The system 1 of FIG. 4 is very similar to the system 1 of FIG. 1, and it will therefore not be described in detail here.

However, in the system 1 of FIG. 4, the hoisting mechanism 6 further comprises wires 15 interconnecting the nacelle 7 of the offshore wind turbine 3 and the landing platform 8.

The load 2 is guided along a diagonal direction, i.e. along a direction having a horizontal component as well as a vertical component, between the nacelle 7 and the floating vessel 14, by means of the wires 15. This is obtained by connecting the load 2 to the wires 15 in a manner which allows the load 2 to move along and be guided by the wires 15. For instance, the load 2 may be connected to the wires 15 via a set of wheels running along the wires 15.

Figure 5:
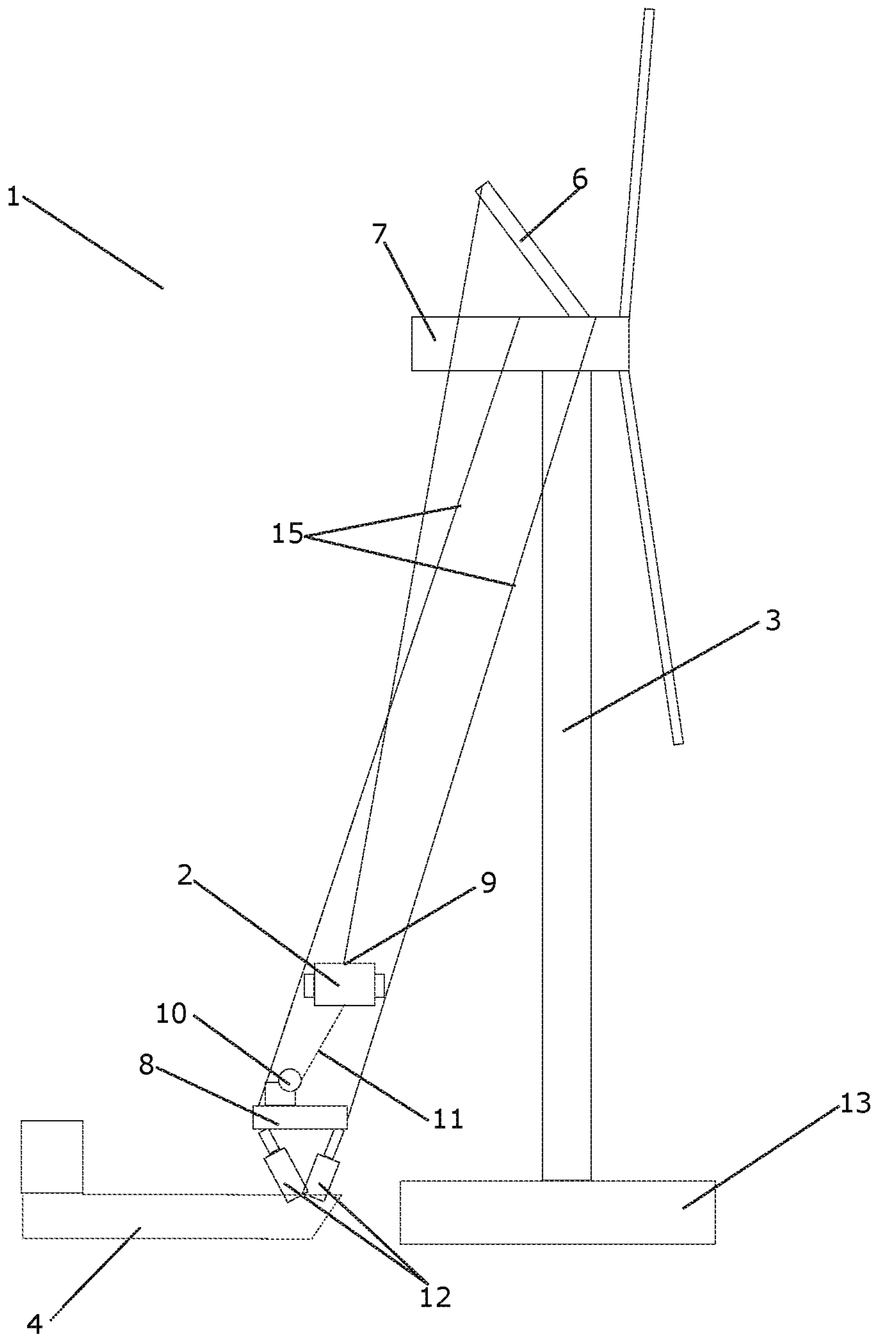

FIG. 5 is a schematic view of a system 1 for transferring a suspended load 2 according to a fifth embodiment of the invention. The system 1 of FIG. 5 is similar to the system 1 of FIG. 2, in the sense that the offshore wind turbine 1 is mounted on a floating foundation 13, and to the system 1 of FIG. 4, in the sense that the hosting mechanism 6 comprises wires 15 interconnecting the nacelle 7 of the offshore wind turbine 3 and the landing platform 8. The system 1 of FIG. 5 will therefore not be described in detail here.

The invention claimed is:

1. A method for controlling transfer of a suspended load between an offshore wind turbine and a floating vessel, where a hoisting mechanism is connected to the offshore wind turbine and the floating vessel comprises an adjustable landing platform, the method comprising the steps of:

detecting movements, relative to the floating vessel, of a load suspended in the hoisting mechanism and/or of a hooking part of the hoisting mechanism, the hooking part being adapted for connecting a load to the hoisting mechanism, adjusting a position and/or inclination of the landing platform, based on the detected movements, in order to compensate for relative movements between the floating vessel and the suspended load and/or the hooking part, thereby synchronizing movements of the landing platform to movements of the suspended load and/or the hooking part, and moving the suspended load and/or the hooking part towards the adjustable landing platform.

2. A method according to claim 1, wherein the load is suspended in the hoisting mechanism, via the hooking part, and wherein the method further comprises the steps of:

moving the suspended load towards the adjustable landing platform, positioning the suspended load on the adjustable landing platform, and releasing the load from the hooking part.

3. A method according to claim 2, further comprising the steps of attaching the load to the hooking part, at an uptower position of the offshore wind turbine, and moving the load towards the adjustable landing platform by means of the hoisting mechanism.

4. A method according to claim 1, wherein the load is positioned on the adjustable landing platform, and wherein the method further comprises the steps of:

moving the hooking part towards the load positioned on the adjustable landing platform, attaching the load to the hooking part, and hoisting the load away from the adjustable landing platform towards an uptower position of the offshore wind turbine by means of the hoisting mechanism.

5. A method according to claim 4, further comprising the step of releasing the load from the hooking part at the uptower position of the offshore wind turbine.

6. A method according to claim 1, further comprising the step of guiding the suspended load and/or the hooking part by means of one or more taglines.

7. A method according to claim 1, wherein the step of detecting movements of a load suspended in the hoisting mechanism and/or of a hooking part of the hoisting mechanism comprises detecting the movements by means of one or more sensors arranged on the suspended load and/or the hooking part, and wherein the method further comprises the step of communicating sensor readings from the one or more sensors to a control unit for controlling the adjustable landing platform.

8. A method according to claim 1, wherein the offshore wind turbine is mounted on a floating foundation.

9. A method according to claim 1, further comprising the step of transferring the suspended load from the hoisting mechanism to a floating hoisting mechanism arranged on the floating vessel and/or from the floating hoisting mechanism to the hoisting mechanism.

10. A method according to claim 9, wherein the floating hoisting mechanism is arranged on the adjustable landing platform.

11. A system for transferring a suspended load, the system comprising:

an offshore wind turbine, a hoisting mechanism being connected to the offshore wind turbine, the hoisting mechanism comprising a hooking part being adapted for connecting a load to the hoisting mechanism, a floating vessel comprising an adjustable landing platform, means for detecting movements, relative to the floating vessel, of a load suspended in the hoisting mechanism and/or of the hooking part of the hoisting mechanism, means for adjusting a position and/or inclination of the landing platform, based on the detected movements in order to compensate for relative movements between the floating vessel and the suspended load and/or the hooking part.

12. A system according to claim 11, wherein the hoisting mechanism forms part of the offshore wind turbine.

13. A system according to claim 11, further comprising one or more taglines for guiding the suspended load.

14. A system according to claim 11, wherein the offshore wind turbine is mounted on a floating foundation.

15. A system according to any claim 11, further comprising a floating hoisting mechanism arranged on the floating vessel.

* * * * *